United States Patent Office 3,337,521
Patented Aug. 22, 1967

3,337,521
COMPLEX METAL COMPOUNDS OF WATER-INSOLUBLE AZO-DYESTUFFS
Hasso Hertel, Offenbach am Main, Rudolf Löwenfeld, Frankfurt am Main, and Reinhard Mohr, Offenbach am Main, Germany, assignors to Farbwerke Hoechst Aktiengesellschaft vormals Meister Lucius & Bruning, Frankfurt am Main, Germany, a company of Germany
No Drawing. Filed Dec. 3, 1963, Ser. No. 327,808
Claims priority, application Germany, Dec. 5, 1962, F 38,470
6 Claims. (Cl. 260—146)

The present invention relates to new complex metal compounds of water-insoluble azo-dyestuffs and to a process for preparing them. It relates in particular to complex metal compounds of water-insoluble azo-dyestuffs of the general formula

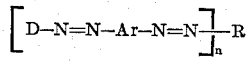

in which D represents the radical of a 7-(4)-aminobenzimidazole, a 7-(4)-aminobenzotriazole or a 4-aminobenzothiazole, Ar represents a 2.4-dihydroxyphenylene radical, a 2.6-dihydroxynaphthylene radical or a 2.7-dihydroxynaphthylene radical, R represents the residue of an aromatic or heterocyclic amine that is free from sulfonic acid groups and carboxylic acid groups and $n$ stands for 1 or 2.

Particularly valuable compounds are the complex copper, cobalt and nickel compounds of the aforesaid dyestuffs which in their metal-free form have the formulae

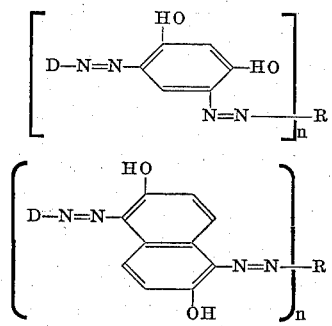

and

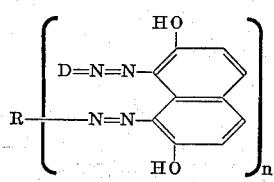

respectively, in which formulae D, R and $n$ have the meanings given above.

German patent specifications Nos. 704,541, 716,433, 909,451 and 1,107,186 describe processes for producing metalliferous, water-insoluble brown or black azo-dyestuffs on the finer by coupling diazotized amines of the series of ice colors with complex metal compounds obtained by coupling of diazotized o-aminophenols, diazotized o-aminonaphthols or diazotized o-aminobenzene carboxylic acids with resorcinol, an alkyl resorcinol or an acyl resorcinol and subsequent metallization. The fastness to washing of the dyeings produced with dyestuffs of the above-mentioned kind is, however, mediocre. From French Patent No. 1,104,146 it is known that complex metal compounds which may be used as coupling components in the preparation of fast black prints on vegetable fibers according to the method applied with ice colors can be obtained by coupling diazotized 4-, 5-, 6- or 7-aminoindazoles with resorcinol and metallizing the resulting compounds.

Now we have found that new complex metal compounds of water-insoluble azo-dyestuffs can be prepared by coupling a complex metal compound of an azo-dyestuff of the general formula

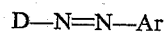

in which D represents the radical of a 7-(4)-aminobenzimidazole, a 7-(4)-aminobenzotriazole or a 4-aminobenzothiazole and Ar represents the radical of a 2.4-dihydroxybenzene, a 2.6-dihydroxynapthalene or a 2.7-dihydroxynaphthalene, which is capable of coupling in o-position to the hydroxy group, in substance or on cellulose material, with a diazo- or tetrazo-compound of a primary aromatic or heterocyclic amono- or diamine and by using components that are free from groups imparting solubility in water, for example, carboxylic acid groups or sulfonic acid groups.

As coupling components that are suitable for use in carrying out the process according to the invention may be mentioned complex metal compounds that are obtained by coupling 1 mol of a diazotized amine of one of the following formulae

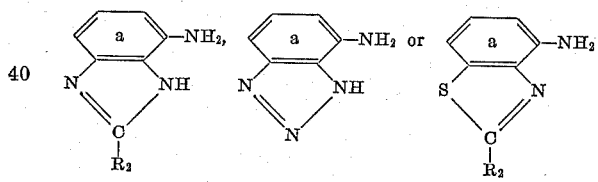

in which $R_2$ represents a hydrogen atom, a hydroxy group or an alkyl group and the benzene radical $a$ may be substituted, for example, by halogen atoms, nitro-, alkyl-, alkoxy-, trifluoromethyl-, sulfonic acid amide-, alkylsulfonyl- or arylsulfonyl groups but should be free from carboxylic acid groups or sulfonic acid groups, with 1 mol of 1.3-dihydroxybenzene, 2.6-dihydroxy naphthalene or 2.7-dihydroxy naphthalene and treating the resulting compound in a neutral, alkaline or acid solution or suspension with an agent yielding metal, especially an agent yielding copper, cobalt or nickel, the preparation of the said complex metal compounds being carried out, for example, according to the method described in French Patent No. 1,277,285. The treatment with an agent yielding metal may be carried out, if desired, in the presence of substances forming complex compounds, for example, triethanol amine, tartaric acid or aminoacetic acid and, if desired, in the presence of an organic solvent, for example, methyl alcohol, ethyl alcohol, acetone, dioxane or dimethyl formamide. The above-described method enables the monoazo-dyestuffs to be obtained in high yields. Owing to their difficult solubility in alkalis, disazo-dyestuffs which may have formed can easily be separated by dissolving the dyestuffs in aqueous alkalis, filtering off the undissolved disazo-dyestuffs and precipitating the monoazo-dyestuffs by adding a mineral acid.

As diazo compounds or tetrazo compounds may be used diazonium or tetrazonium salts, for example, the double salt of diazonium chloride and zinc chloride, diazonium aryl sulfonates, diazonium chlorides, diazonium sulfates or diazonium boron fluorides, and diazoamino or tetrazo amino compounds or antidiazotates of primary aromatic or heterocyclic mono- or diamines as are usually applied in the preparation of ice colors (cf. Diserenes, "Die neuesten Fortschritte in der Anwendung der Fabstoffe," vol. 1 3rd edition, 1951, pages 646 to 684).

The process according to the present invention enables predominantly brown to black dyeings and prints which are distinguished by good fastness properties, in particular a good fastness to light and wet processing, to be prepared on cellulose materials, for example, fibers or fabrics of natural or regenerated cellulose.

The new complex metal compounds of water-insoluble azo-dyestuffs, which have been prepared in substance, can be used for dyeing synthetic fibers and plastic masses of high molecular weight.

The dyeings produced on cotton with the dyestuffs obtained by the process according to the invention have a better fastness to washing than those produced with the dyestuffs described in French Patent No. 1,104,146, which contain as coupling components the complex metal compounds of products obtained by coupling diazotized 4-, 5-, 6- or 7-amino-indazoles with 1.3-dihydroxybenzene.

The following examples serve to illustrate the invention but they are not intended to limit it thereto.

*Example 1*

Cotton fabric was treated in the impregnating bath described hereafter and squeezed between rollers until the amount of liquid absorbed was equal to 70% of the weight of the material.

*Impregnating bath.*—11 grams of the complex nickel compound of the monoazo-dyestuff obtained from diazotized 7-amino-5-chloro-benzimidazole and 1,3-dihydroxybenzene, which was dissolved in 11 cc. of sodium hydroxide solution of 32.5% strength, 22 cc. of denatured ethyl alcohol, 10 cc. of the sodium salt of castor oil sulfonic acid and 11 cc. of water were introduced, while stirring, into 1 liter of water having a temperature of 90° C. and containing 4 cc. of sodium hydroxide solution of 32.5% strength.

The fabric was then dried, treated in the developing bath described hereafter and squeezed between rollers until the amount of liquid absorbed was equal to 100% of the weight of the material.

*Developing bath.*—4.6 grams of 1-amino-3-nitrobenzene were diazotized in the usual manner with hydrochloric acid and sodium nitrite and dissolved in 1 liter of water which had a temperature of 20° C. and contained 2 grams of the product obtained by the reaction of about 20 mols of ethylene oxide with 1 mol of octadecyl alcohol, 3 cc. of acetic acid of 50% strength and 6 grams of sodium acetate. After a residence time of 30 seconds in the air the goods were treated in a water bath having a temperature of 60° C., soaped for 10 minutes at 95° C. with an aqueous solution which, per liter, contained 1 gram of a product obtained by the reaction of about 10 mols of ethylene oxide with 1 mol of nonyl phenol and 3 grams of sodium carbonate, aftertreated in usual manner, rinsed and dried. A full black brown dyeing having good fastness properties, in particular a good fastness to washing, was obtained.

*Example 2*

Cotton fabric was treated in the impregnating bath described hereafter and squeezed between rollers until the amount of liquid absorbed was equal to 70% of the weight of the material.

*Impregnating bath.*—12 grams of the complex nickel compound of the monoazo-dyestuff obtained from diazotized 7-amino-2-methyl-5-chlorobenzimidazole and 1,3-dihydroxybenzene, which were dissolved in 12 cc. of sodium hydroxide solution of 32.5% strength, 24 cc. of denatured ethyl alcohol, 10 cc. of the sodium salt of castor-oil sulfonic acid, 24 cc. of diethylene-glycol and 12 cc. of water were introduced, while stirring, into 1 liter of water which had a temperature of 90° C. and contained 4 cc. of sodium hydroxide solution of 32.5% strength and 10 grams of sodium sulfate.

The goods were then dried and treated for 20 minutes at 20° C., at a goods-to-liquor ratio of 1:20, in a developing bath which per liter of water contained 2.3 grams of diazotized 1-amino-2.5-dichlorobenzene, 2 grams of a product obtained by the reaction of about 20 mols of ethylene oxide with 1 mol of octadecyl alcohol, 1 cc. of acetic acid of 50% strength, 6 grams of sodium acetate and 20 grams of sodium chloride. The goods were then rinsed with water, aftertreated for 15 minutes at 95° C. with water which, per liter, contained 1 gram of a product obtained by the reaction of about 10 mols of ethylene oxide/1 mol of nonyl phenol and 3 grams of sodium carbonate/1 l. water, rinsed and dried. A full brown dyeing of good fastness properties, in particular of good fastness to washing, was obtained.

*Example 3*

31.8 parts by weight of the 1.2-complex cobalt compound of the dyestuff of the formula

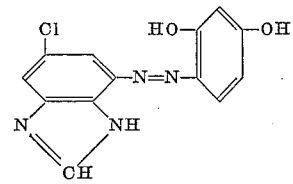

were dissolved in a mixture of 500 parts by volume of water, 40 parts by volume of 5 N-sodium hydroxide solution and 100 parts by volume of 2 N sodium carbonate solution. Into the resulting red violet solution a diazo-solution which had been prepared by diazotizing 9.3 parts by weight of aniline in 250 parts by volume of water with 50 parts of volume of 5 N-hydrochloric acid solution and 20 parts by volume of 5 N sodium nitrite solution, were introduced drop by drop. When coupling was terminated the disazo-dyestuff was filtered off with suction, washed with water until neutral and dried. About 41 parts by weight of the 1.2-complex cobalt compound of the dyestuff of the formula

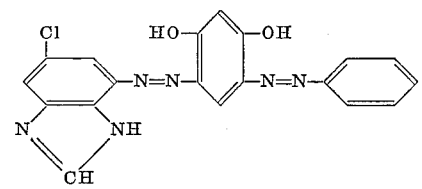

were obtained in the form of an almost black powder.

The following table comprises a number of further components that may be used according to the invention, and the tints produced with them on cotton, which tints likewise possess good fastness properties.

TABLE

| Coupling Component | Diazo Component | Tint |
|---|---|---|
| 7-aminobenzotriazole→1,3-dihydroxybenzene, nickel complex compound | 1-amino-2-chlorobenzene | Brown. |
| Do | 1-amino-3-chlorobenzene | Dark brown. |
| Do | 1-amino-2-nitrobenzene | Do. |
| Do | 1-amino-2-ethylsulfonyl-5-trifluoromethyl benzene | Do. |
| Do | 1-amino-2,5-dichlorobenzene | Do. |
| 7-aminobenzotriazole→2,6-dihydroxynaphthalene, cobalt complex compound. | 1-amino-2-nitrobenzene | Black. |
| Do | 1-amino-2-chloro-5-trifluoromethylbenzene | Greenish black. |
| Do | 1-amino-2,5-dichlorobenzene | Do. |
| Do | 1-amino-2-nitro-4-methylbenzene | Black. |
| Do | 1-amino-2,5-dimethoxy-4-benzonitrile | Do. |
| 7-amino-5-chlorobenzimidazole→1,3-dihydroxybenzene, nickel complex compound. | 4,4'-dichloro-2-aminodiphenyl ether | Dark brown. |
| Do | 4-chloro-2-amino-1,1'-diphenyl ether | Do. |
| Do | 4-amino-3-chloro-3'-nitroazobenzene | Black brown. |
| Do | 1-amino-2,5-dichlorobenzene | Do. |
| Do | 1-amino-2-methyl-4-chlorobenzene | Red brown. |
| Do | 4-amino-4'-methoxydiphenylamine | Currant-hued dark brown. |
| Do | 1-amino-4-benzoylamino-2,5-diethoxybenzene | Black brown. |
| Do | 4,4'-diamino-3,3'-dimethoxydiphenyl | Do. |
| 7-amino-2-hydroxy-5-methylbenzimidazole→1,3-dihydroxybenzene, cobalt complex compound. | 1-amino-2-methoxy-5-nitrobenzene | Do. |
| Do | 1-amino-2-nitro-4-chlorobenzene | Do. |
| Do | 1-amino-2,5-dichlorobenzene | Do. |
| Do | 1-amino-2-ethylsulfonyl-5-trifluoromethylbenzene | Do. |
| 7-amino-2-hydroxy-5-methylbenzimidazole→1,7-dihydroxynaphthalene, cobalt complex compound. | 1-amino-2-chlorobenzene | Brown. |
| Do | 1-amino-2,5-dichlorobenzene | Do. |
| Do | 1-amino-2-methyl-5-nitrobenzene | Do. |
| Do | 1-amino-2-methoxy-5-nitrobenzene | Do. |
| Do | 1-amino-2-nitro-4-chlorobenzene | Dark brown. |
| Do | 1-amino-2-nitro-4-methylbenzene | Brown. |
| 7-amino-2-methyl-5-chloro-benzimidazole→1,3-dihydroxybenzene, nickel complex compound. | 1-amino-2-chlorobenzene | Dark brown. |
| Do | 1-amino-2-methyl-4-chlorobenzene | Red Brown. |
| Do | 4-amino-3-chloro-3'-nitroazobenzene | Black brown. |
| Do | 1-amino-3-nitrobenzene | Do. |
| Do | 4-amino-diphenylamine | Currant-hued dark brown. |
| 4-amino-5-chlorobenzothiazole→1,3-dihydroxybenzene, nickel complex compound | 1-amino-3-nitrobenzene | Dark brown. |
| Do | 1-amino-2,5-dichlorobenzene | Do. |
| Do | 4,4'-dichloro-2-aminodiphenyl ether | Do. |
| Do | 1-amino-2-chlorobenzene | Do. |
| Do | 4-amino-3-chloro-3'-nitroazobenzene | Do. |
| Do | 4,4'-diamino-3,3'-dimethoxydiphenyl | Do. |
| 7-amino-6-chloro-benzimidazole→1,3-dihydroxybenzene, copper complex compound. | 1-amino-2-chlorobenzene | Brown. |
| Do | 1-amino-3,5-bis-trifluoromethylbenzene | Do. |
| Do | 1-amino-2-methyl-5-nitrobenzene | Do. |
| Do | 1-amino-4-chloro-2-trifluor-methylbenzene | Dark brown. |
| Do | 1-aminoanthraquinone | Brown. |
| Do | 1-amino-2,5-dimethoxy-4-benzonitrile | Dark brown. |
| 7-amino-6-chloro-benzimidazole→1,3-dihydroxybenzene, nickel complex compound. | 1-amino-2,5-dichlorobenzene | Black brown. |
| Do | 4,4'-dichloro-2-aminodiphenyl ether | Dark brown. |
| Do | 4-chloro-2-amino-1,1'-diphenyl ether | Black brown. |
| Do | 1-aminoanthraquinone | Dark brown. |
| Do | 1-amino-2-nitro-4-chlorobenzene | Black brown. |

We claim:
1. A complex copper, cobalt or nickel compound of the dyestuff of the formula

[D—N=N—Ar—N=N]$_n$R wherein D stands for

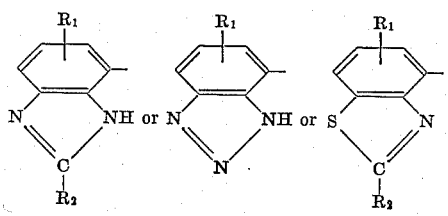

in which $R_1$ stands for hydrogen, chlorine or methyl and $R_2$ stands for hydrogen, hydroxy or alkyl; Ar represents 2,4-dihydroxyphenylene, 2,6-dihydroxynaphthylene or 2,7-dihydroxynaphthylene; R represents phenyl; phenyl substituted by one or more members of the group consisting of nitro, chloro, ethyl, sulfonyl, trifluoromethyl, methyl, methoxy, ethoxy, cyano, phenoxy, phenylamino, methoxy phenylamino, chlorophenoxy, phenyl azo, nitrophenyl azo, benzoylamino and methoxyphenyl; or anthraquinonyl, and wherein n stands for 1 or 2.

2. The complex nickel compound of the azo dyestuff of the formula

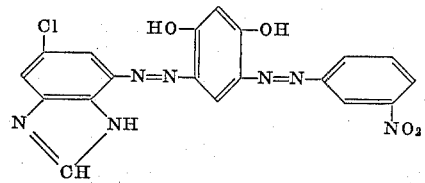

3. The complex nickel compound of the azo-dyestuff of the formula

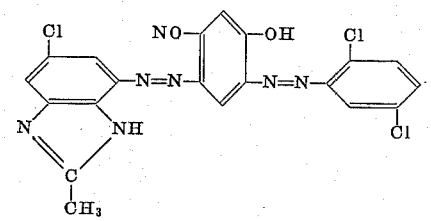

4. The complex cobalt compound of the azo-dyestuff of the formula
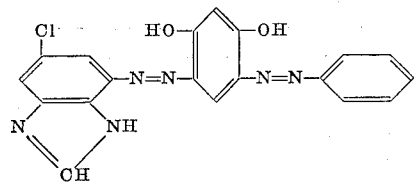
5. The complex copper compound of the azo-dyestuff of the formula
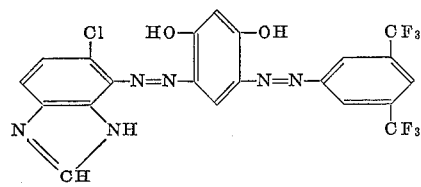
6. The complex cobalt compound of the azo-dyestuff of the formula
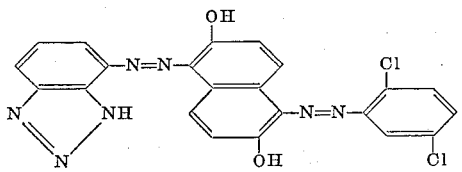
References Cited
FOREIGN PATENTS
1,173,373  10/1958  France.
CHARLES B. PARKER, *Primary Examiner.*
D. M. PAPUGA, *Assistant Examiner.*